(12) United States Patent
Chase et al.

(10) Patent No.: US 8,081,631 B1
(45) Date of Patent: *Dec. 20, 2011

(54) TECHNIQUE FOR ETHERNET ACCESS TO PACKET-BASED SERVICES

(75) Inventors: Christopher J Chase, Freehold, NJ (US); Stephen L Holmgren, Little Silver, NJ (US); David Kinsky, Piscataway, NJ (US); John Babu Medamana, Colts Neck, NJ (US); Jeewan P. Ramsaroop, Edison, NJ (US); Mateusz W. Szela, Hillsborough, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 411 days.

This patent is subject to a terminal disclaimer.

(21) Appl. No.: 11/539,767

(22) Filed: Oct. 9, 2006

Related U.S. Application Data

(63) Continuation of application No. 09/772,360, filed on Jan. 30, 2001, now Pat. No. 7,120,150.

(51) Int. Cl.
*H04L 12/28* (2006.01)
*H04L 12/56* (2006.01)
*H04J 3/04* (2006.01)

(52) U.S. Cl. .................... 370/392; 370/399; 370/404

(58) Field of Classification Search .................. None
See application file for complete search history.

(56) References Cited

U.S. PATENT DOCUMENTS

| | | | |
|---|---|---|---|
| 5,434,850 A | 7/1995 | Fielding | |
| 5,465,254 A | 11/1995 | Wilson et al. | |
| 5,649,108 A | 7/1997 | Spiegel et al. | |
| 5,920,562 A | 7/1999 | Christie et al. | |
| 5,930,259 A * | 7/1999 | Katsube et al. | 370/409 |
| 6,035,105 A | 3/2000 | McCloghrie et al. | |
| 6,052,383 A | 4/2000 | Stoner et al. | |
| 6,081,524 A | 6/2000 | Chase et al. | |
| 6,151,324 A * | 11/2000 | Belser et al. | 370/397 |
| 6,219,699 B1 | 4/2001 | McCloghrie et al. | |
| 6,498,794 B1 | 12/2002 | Tsukamoto et al. | |
| 6,643,265 B1 | 11/2003 | Schzukin | |
| 6,680,945 B1 | 1/2004 | Merchant et al. | |
| 6,731,649 B1 | 5/2004 | Silverman | |
| 6,751,220 B1 * | 6/2004 | Li | 370/390 |
| 6,771,662 B1 | 8/2004 | Miki et al. | |

(Continued)

OTHER PUBLICATIONS

IEEE Standard 802.1Q-1998 "Virtual Bridged Local Area Networks", Institute for Electrical and Electronic Engineers, Inc., 1998, See Annex C.

(Continued)

*Primary Examiner* — Gregory Sefcheck
*Assistant Examiner* — Ashley Shivers

(57) ABSTRACT

An Ethernet Metropolitan Area Network provides connectivity to one or more customer premises to packet-based services, such as ATM, Frame Relay, or IP, while advantageously providing a mechanism for assuring security and regulation of customer traffic. Upon receipt of each customer-generated information frame, an ingress Multi-Service Platform (MSP) "tags" the frame with a customer descriptor that specifically identifies the recipient customer. In practice, the MSP tags each frame by overwriting the Virtual Local Area Network (VLAN) identifier with the customer descriptor. Using the customer descriptor in each frame, a recipient Provider Edge Router (PER) or ATM switch can map the information as appropriate to direct the information to the specific customer at its receiving site. In addition, the customer descriptor may also include Quality of Service (QoS) information, allowing the recipient Provider Edge Router (PER) or ATM switch to afford the appropriate QoS level accordingly.

18 Claims, 7 Drawing Sheets

U.S. PATENT DOCUMENTS

| | | | |
|---|---|---|---|
| 6,771,673 B1 | 8/2004 | Baum et al. | |
| 6,782,503 B1 | 8/2004 | Dawson | |
| 6,788,681 B1* | 9/2004 | Hurren et al. | 370/389 |
| 6,813,644 B1* | 11/2004 | Jamieson et al. | 709/242 |
| 6,847,644 B1 | 1/2005 | Jha | |
| 6,856,676 B1 | 2/2005 | Pirot et al. | |
| 6,912,592 B2 | 6/2005 | Yip | |
| 6,963,585 B1 | 11/2005 | Le Pennec et al. | |
| 6,975,627 B1 | 12/2005 | Parry et al. | |
| 7,092,389 B2 | 8/2006 | Chase et al. | |
| 7,120,150 B2 | 10/2006 | Chase et al. | |
| 7,194,554 B1 | 3/2007 | Short et al. | |
| 2002/0089992 A1* | 7/2002 | Yip et al. | 370/401 |
| 2002/0097732 A1* | 7/2002 | Worster et al. | 370/408 |
| 2003/0039212 A1 | 2/2003 | Lloyd et al. | |

OTHER PUBLICATIONS

Yipes Communications, Internet Web site-2001 (http://yipes.com/services).

Sales Literature, "Managed IP Optical Interworking, A Regional IP-over-Fiber Network Service Architecture", Yipes Communications, 2000.

Telseon, Inc., Internet Web site-2001 (http://telseon.com).

Sales Literature, "Telseon IP Service: Enabling E-Commerce Through Instant Bandwidth", Telseon, Inc., Aug. 2000.

U.S. Appl. No. 11/493,157, filed Jul. 25, 2006, consists of 22 pages.

\* cited by examiner

TECHNIQUE FOR ETHERNET ACCESS TO PACKET-BASED SERVICES

CROSS REFERENCE TO RELATED APPLICATIONS

This application is a continuation of U.S. patent application Ser. No. 09/772,360 filed Jan. 30, 2001 now U.S. Pat. No. 7,120,150 entitled "TECHNIQUE FOR ETHERNET ACCESS TO PACKET-BASED SERVICES", which is incorporated herein by reference.

TECHNICAL FIELD

This invention relates to a technique enabling access to packet-based services, such as IP, Frame Relay, and ATM, through an Ethernet Protocol network.

BACKGROUND ART

Presently, communication service providers, such as AT&T, offer high-speed data communications service to customers through a variety of access mechanisms. For example, a customer may gain network access through a private line connection, i.e., a direct link: to the communications service provider's network. Private line access provides a dedicated port not shared by anyone else with facility bandwidth available exclusively to the particular customer. Unfortunately, private line access is expensive, and is practical only for customers that have very high traffic capacity requirements.

As an alternative to private line access, communications service providers such as AT&T also offer virtual circuit access allowing several customers to logically share a single circuit, thus reducing costs. Such shared circuits, typically referred to as Permanent Virtual Circuits, allow communication service providers to guarantee customer traffic flows that are distinguishable from each other, are secure, and allow customers to enjoy different service features. An example of such a technique for offering such shared service is disclosed in U.S. Pat. No. 6,081,524, assigned to AT&T.

Presently, there is a trend towards using Ethernet networks in place of Frame Relay and A TM networks especially for transporting traffic among two or more premises belonging to the same customer. Ethernet-based Metropolitan Area Networks (MANs) currently exist in many areas and offer significant cost advantages on a per port basis, as compared to Frame Relay and ATM service. Transmission speeds as high as 100, 1000 or even 10,000 MB/second are possible with such Ethernet MANs. Moreover, optical Ethernet MANs typically offer a rich set of features, flexible topology and simple-end-to end provisioning.

Present-day Ethernet-based MANs lack the ability to logically separate traffic received from different customers, giving rise to issues of data security. Moreover, such present day Ethernet-based MANs lack the ability to manage bandwidth among customers, thus preventing the network from regulating customer traffic to assure equitable access. Thus, there is a need for a technique for routing data in an Ethernet protocol network that overcomes the aforementioned disadvantages.

BRIEF SUMMARY OF THE INVENTION

Briefly, in accordance with a preferred embodiment, a method is provided for routing data in an Ethernet protocol network having a plurality of platforms, each serving one or more customers. A first platform receives at least one frame from a sending site (e.g., a first customer's premises) that is destined for a receiving site (e.g., another premises belonging to the same or a different customer.) After receiving the frame, the first platform overwrites a portion of the frame with a customer descriptor that specifically identifies the sending customer. In practice, the first platform may overwrite a Virtual Local Area Network (VLAN) field that is typically employed by the sending customer for the purposes of routing data among various VLANs at the sending premises. Rather than overwrite the VLAN field in the frame, the first platform could overwrite another field, such as the source address field, or could even employ a "shim" header containing the customer descriptor. All further use of the term customer descriptor implies that any of the above or similar techniques could be used.

After overwriting the frame with the customer descriptor, the sending platform routes the frame onto the MAN for routing among the other platforms, thereby sharing trunk bandwidth and other resources, but logically distinct from other customers' traffic with different customer descriptors. A destination address in the frame directs the frame to its corresponding endpoint. Upon receipt of the frame, the receiving platform uses the customer descriptor to segregate the frame for delivery to the proper destination, especially in the event where different customers served by the same platform use overlapping addressing plans. Thus, the customer descriptor in each frame advantageously enables the receiving platform to distinguish between different customers served by that platform.

For traffic with a destination beyond the MAN, this method provides a convenient and efficient way to map the customer descriptor to similar identifiers in a Wide Area Network (WAN), such as a Permanent Virtual Circuit (PVC), a Virtual Private Network (VPN); or an MPLS Label Switched Circuit.

Overwriting each frame with the customer descriptor thus affords the ability to logically segregate traffic on the Ethernet MAN to provide Virtual Private Network (VPN) services of the type offered only on more expensive Frame Relay and ATM networks. Moreover, the customer descriptor used to tag each frame can advantageously include Quality of Service (QoS) information, allowing the sender to specify different QoS levels for different traffic types, based on the Service Level Agreement (SLA) between the customer and the communications service provider.

DETAILED DESCRIPTION

Figure 1:
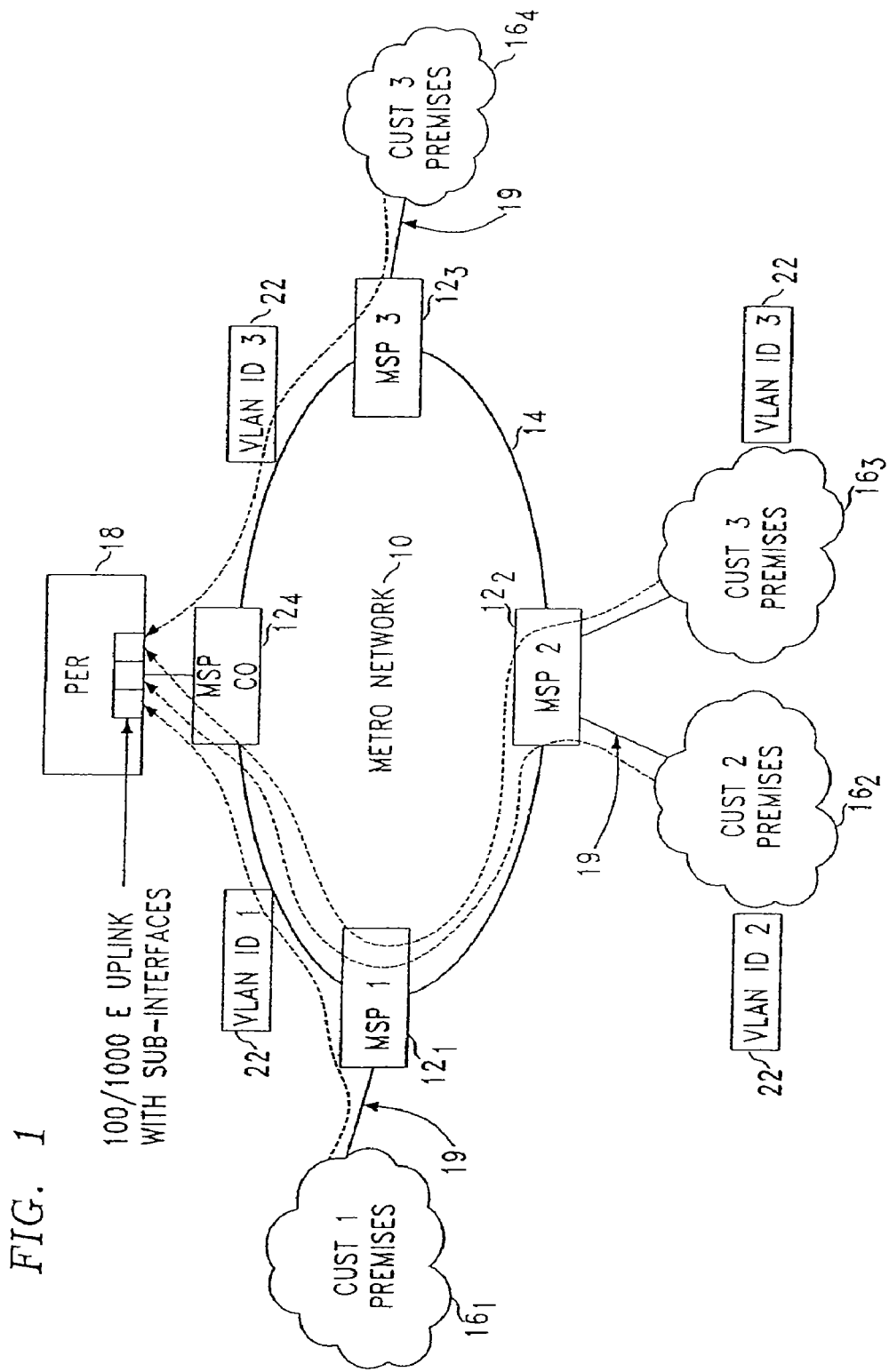
FIG. 1 depicts an Ethernet Protocol Metropolitan Area Network (MAN) in which each frame is tagged with a customer descriptor in its VLAN field in accordance with the present principles.

FIG. 1 depicts an Ethernet Protocol Metropolitan Area Network (MAN) 10 comprised of a plurality of Multi-Service Platforms (MSPs) $12_1$-$12_n$ where $n$ is an integer, each MSP taking the form of an Ethernet switch or the like. In the illustrated embodiment n=4 although the network 10 could include a smaller or, larger number of MSPs. A fiber ring or SONET ring infrastructure 14 connects the platforms $12_1$-$12_4$ in daisy-chain fashion allowing each MSP to statistically multiplex information onto, and to statistically de-multiplex information off the ring infrastructure 14.

Each of MSPs $12_1$-$12_3$ serves at least one, and in some instances, a plurality of premises 16 belonging to one or more customers. In the illustrated embodiment of FIG. 1, the MSP $12_1$ serves a single customer premises $16_1$ belonging to customer 1 whereas, the MSP $12_2$ serves premises $16_2$, and $16_3$ belonging to customers 2 and 3, respectively. The MSP $12_3$ serves a single premises $16_4$ that belongs to customer 3. The MSPs $12_1$-$12_3$ are linked to their corresponding premises via 10, 100 or 1000 MB links 19. The MSP $12^4$ bears the legend "MSP CO" because it serves as a central office to route traffic from the MAN 10 to a Provider Edge Router (PER) 18 for delivery to other networks, such as Frame Relay, ATM, MPLS networks or the Internet as discussed hereinafter. By the same token, the PER 18 can route traffic from such other networks onto the MAN 10 via the MSP CO $12_4$.

Figure 2:
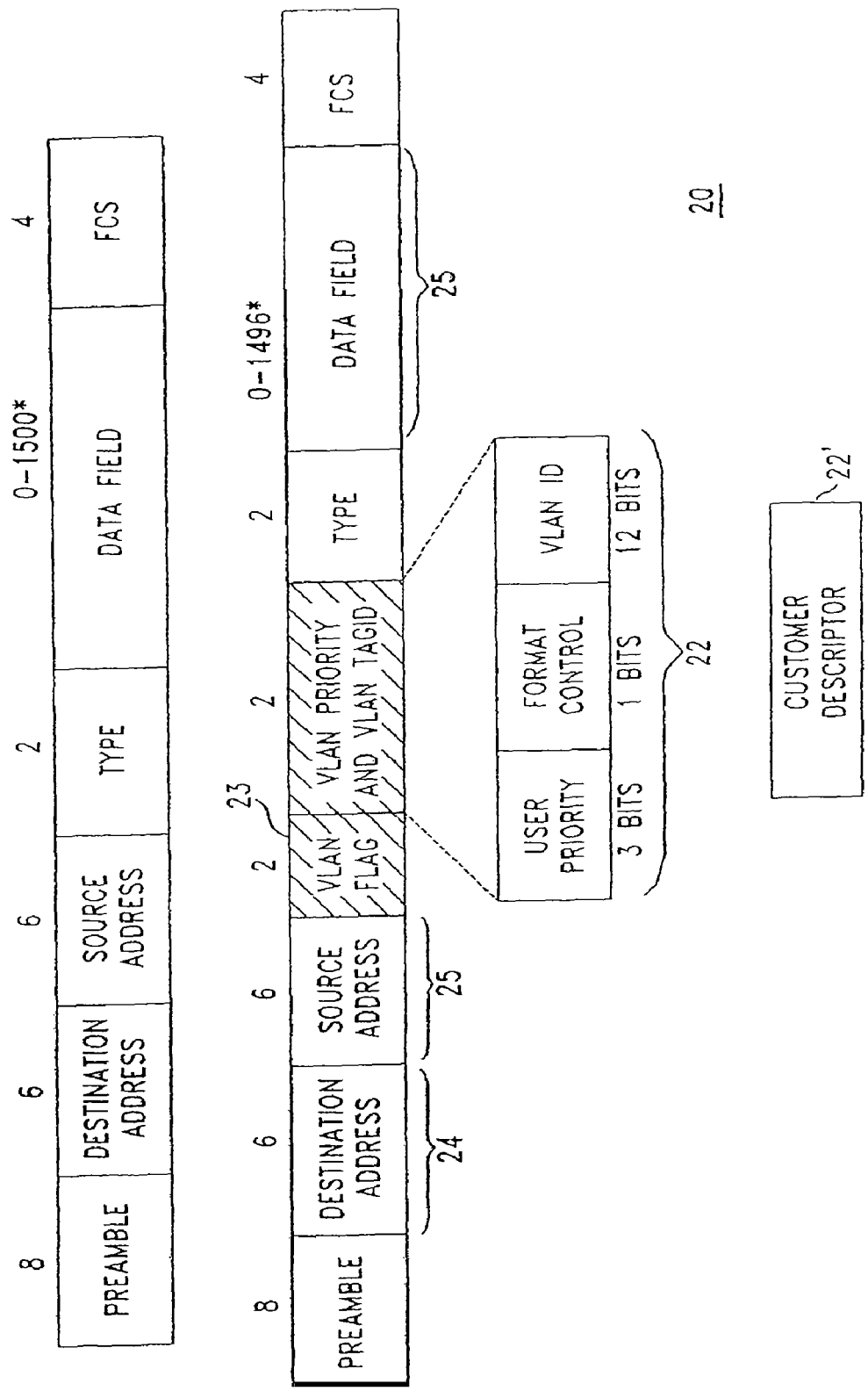
FIG. 2 illustrates a sample frame for transmission over the, network of FIG. 1.

The traffic routed onto and off of the MAN 10 by each MSP takes the form of one or more frames 20 depicted in FIG. 2. Heretofore, traffic routed onto the MAN 10 from a particular customer's premises was combined with other customers' traffic with no logical separation, thus raising security concerns. Moreover, since all customers' traffic share the same bandwidth, difficulties existed in prior art Ethernet MANs in regulating the traffic from each customer's premises, and in affording different customers different Quality of Service (QoS) levels in accordance with individual Service Level Agreements.

These difficulties are overcome in accordance with the present principles by "tagging" each frame 20 routed onto the MAN 10 at a particular MSP, say MSP $12_3$, with a customer descriptor 22' (best seen in FIG. 2) that identifies the customer sending that frame. As discussed in greater detail below, each MSP receiving a frame 20 on the fiber ring infrastructure 14 uses the customer descriptor 22' in that frame to maintain distinct routing and addressing tables that are assigned to each customer served by that MSP. This permits each customer to use its own addressing plan without fear of overlap with other customers, as the customers are all maintained as logically separate.

FIG. 2 depicts the structure of an exemplary Ethernet protocol frame 20 specified by Ethernet Standard 802.1 Q. Among the blocks of bytes within each frame 20 is a Virtual Local Area Network (VLAN) Identifier 22 comprised of sixteen bits. In practice, the VLAN identifier 22, in conjunction with a VLAN flag 23 within the frame, facilitates routing of the frame within, a customer's premises to a particular VLAN. However, the VLAN identifier 22 has no influence on routing of the frame 20 after receipt at a MSP.

In accordance with the present principles, the prior disadvantages associated with conventional Ethernet networks, namely the lack of security and inability to regulate QoS levels, are overcome by overwriting the VLAN identifier 22 in each frame 20 with the customer descriptor maintained by the service provider. Overwriting the VLAN identifier 22 of FIG. 2 of each frame 20 with the customer descriptor 22' serves to "tag" that frame with the identity of its sending customer, thus affording each MSP in the MAN 10 the ability to route those frames only among the premises belonging to that same sending customer. Such tagging affords the operator of the MAN 10 the ability to provide security in connection with frames transmitted across the network, since frames with customer ID A would not be delivered to any premises of customer with ID B. As an example, two or more customers served by a single MSP may use overlapping IP addressing schemes. In the absence of any other identifier, the MSP receiving frames with overlapping IP addresses lacks the ability to assure accurate delivery.

In the illustrated embodiment depicted in FIG. 2, each MSP of FIG. 1 tags each outgoing frame 20 by overwriting the VLAN identifier 22 with the customer descriptor 22'. However, tagging could occur in other ways, rather than overwriting the VLAN identifier 22. For example, the source address block 25 within the frame 20 could be overwritten with the customer descriptor 22'. Alternatively, the data field 21 could include a shim header comprising the customer descriptor 22'.

Figure 3:
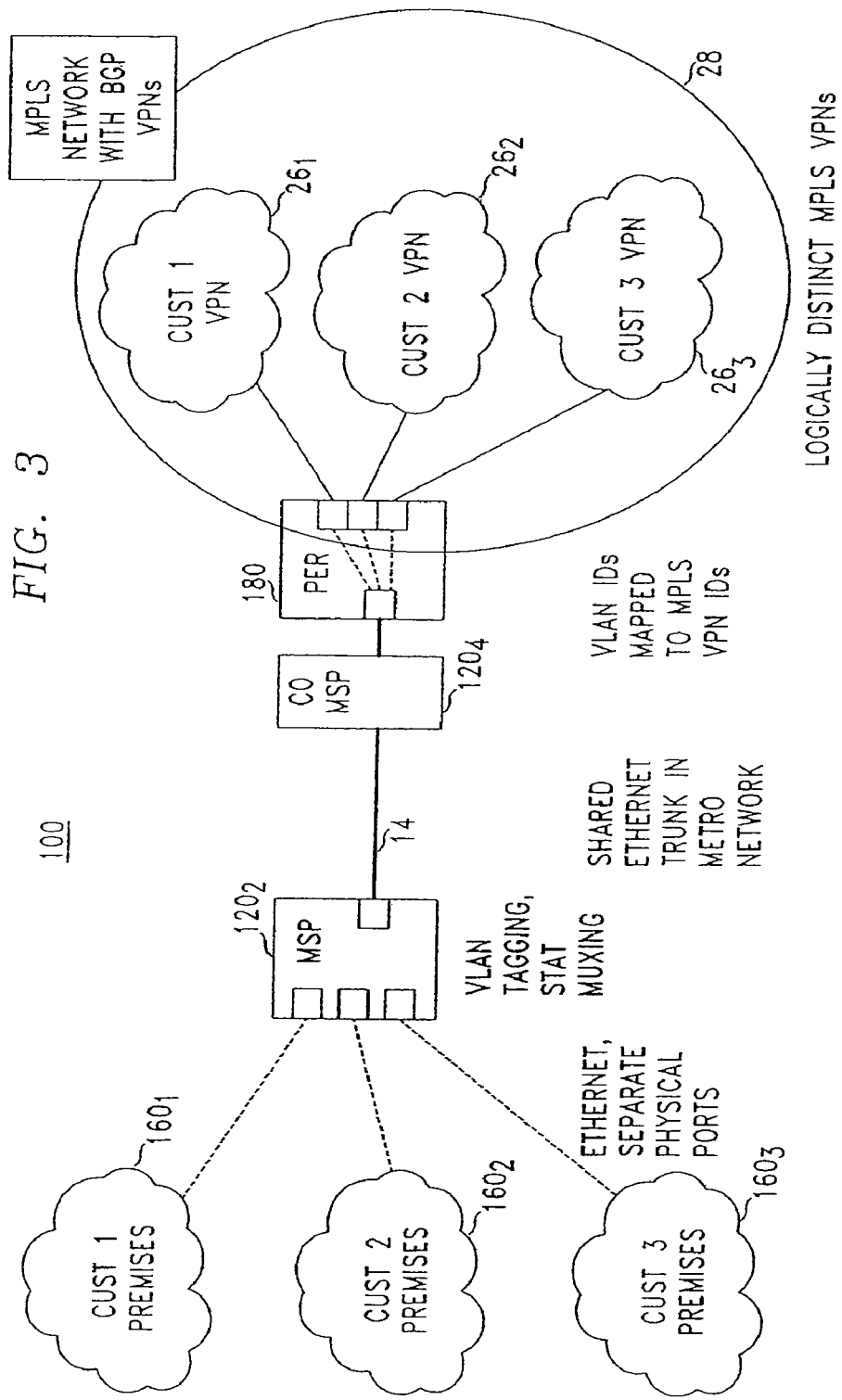
FIG. 3 illustrates a portion of the MAN showing the various stages in the tagging process.

The tagging of each frame 20 with the customer descriptor 22' affords several distinct advantages in connection with routing of the frames through the MAN 10. First, as discussed above, the tagging affords each recipient MSP the ability to distinguish traffic destined for customers with overlapping address schemes, and thus allows for segregating traffic on the MAN 10. Further, tagging each frame 20 with the customer descriptor 22' enables mapping of the frames from a MAN 100 depicted in FIG. 3 to corresponding one of a plurality of customer Virtual Private Networks $26_1$-$26_3$ within an MPLS network 28. As seen in FIG. 3, an MSP $120_2$ within the MAN 100 receives traffic from premises $160_1$, $160_2$, and $160_3$ belonging to customer 1, customer 2 and customer 3, respectively, which enjoy separate physical links to the MSP. Upon receipt of each frame from a particular customer, the MSP $120_2$ overwrites that frame with the customer descriptor 22' corresponding to the sending customer.

After tagging each frame, the MSP $120_2$ statistically multiplexes the frames onto the fiber ring infrastructure 14 for transmission to a CO MSP $120_4$ for receipt at a destination PER 180 that serves the MPLS network 28 within which are customer Virtual Private Networks $26_1$-$26_3$. Using the customer descriptor 22' in each frame, the PER 180 maps the frame to the corresponding VPN identifier associated with a particular one of customer Virtual Private Networks $26_1$-$26_3$ to properly route each frame to its intended destination.

Figure 4:
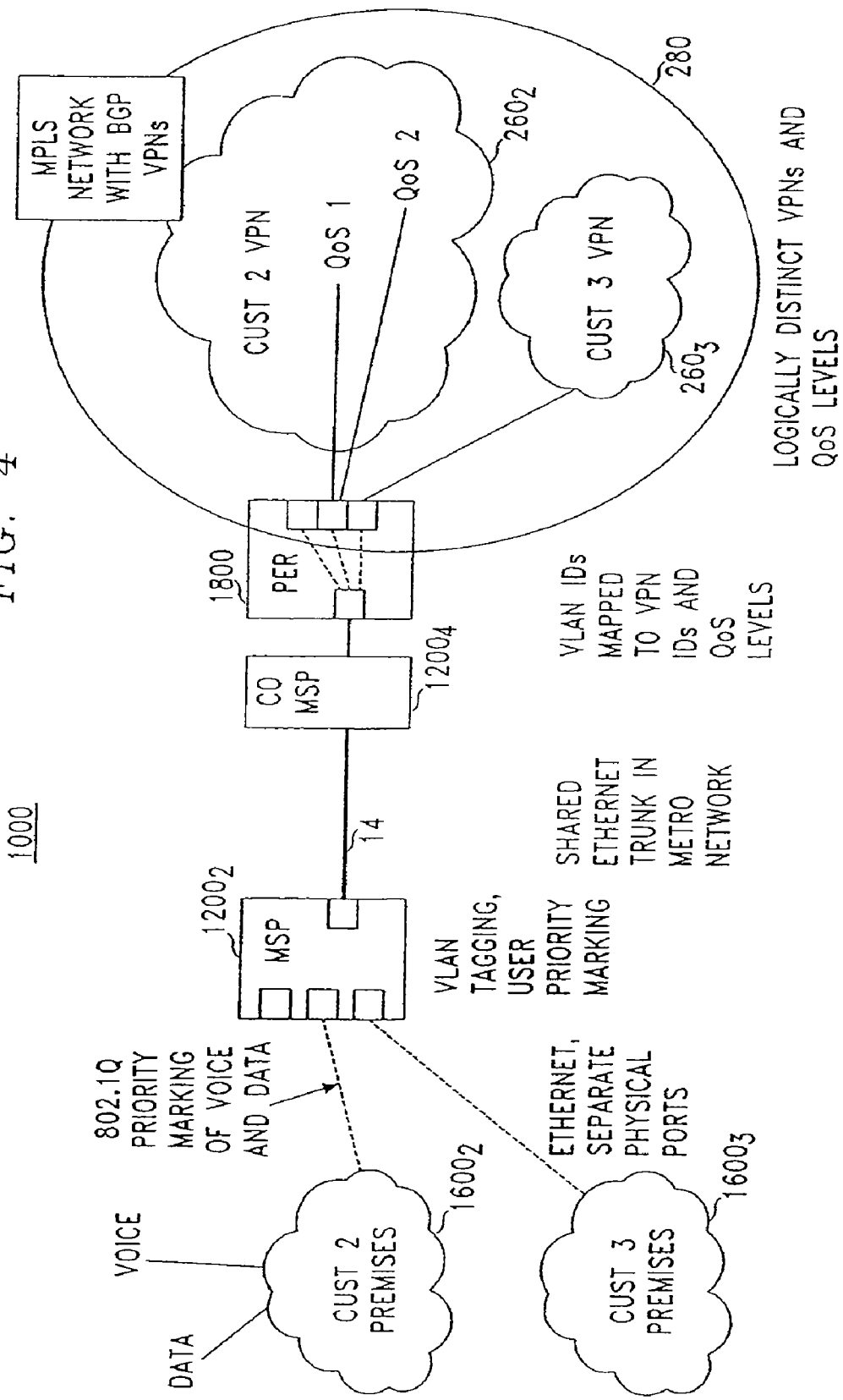
FIG. 4 illustrates a portion of a MAN showing the use of the priority bits within the VLAN field to establish different Quality of Service levels.

The tagging scheme of the present invention also affords the ability to route frames with different QoS levels within a MAN 1000 depicted in FIG. 4. As seen in FIG. 4, an MSP $1200_2$ within the MAN 1000 receives traffic from premises $1600_2$, and $1600_3$ belonging to customer 2 and customer 3, respectively, which enjoy separate physical links to the MSP, allowing each to send frames into the MAN. In the illustrated embodiment of FIG. 4, the frames originating from the premise $1600_2$ may contain either voice or data and have a corresponding QoS level associated with each type of frame. Upon receiving such frames, the MSP $1200_2$ overwrites the frame with the customer descriptor 22' corresponding to the particular customer sending the frame. The customer descriptor 22' will not only contain the identity of the sending customer, but the corresponding QoS level associated with that frame.

After tagging each frame, the MSP $1200_2$ statistically multiplexes the frames onto the fiber ring infrastructure 14 for transmission to a CO MSP $1200_4$ for receipt at a destination PER 1800 that serves an MPLS network 280 within which are customer Virtual Private Networks $260_2$ and $260_3$. Using the customer descriptor 22' in each frame, the PER 1800 of FIG. 4 maps the frame to the corresponding customer VPN to properly route each frame to its intended customer VPN. Further, the PER 1800 of FIG. 4 also maps the QoS level specified in the customer descriptor in the frame to assure that the appropriate quality of service level is applied to the particular frame.

Figure 5:
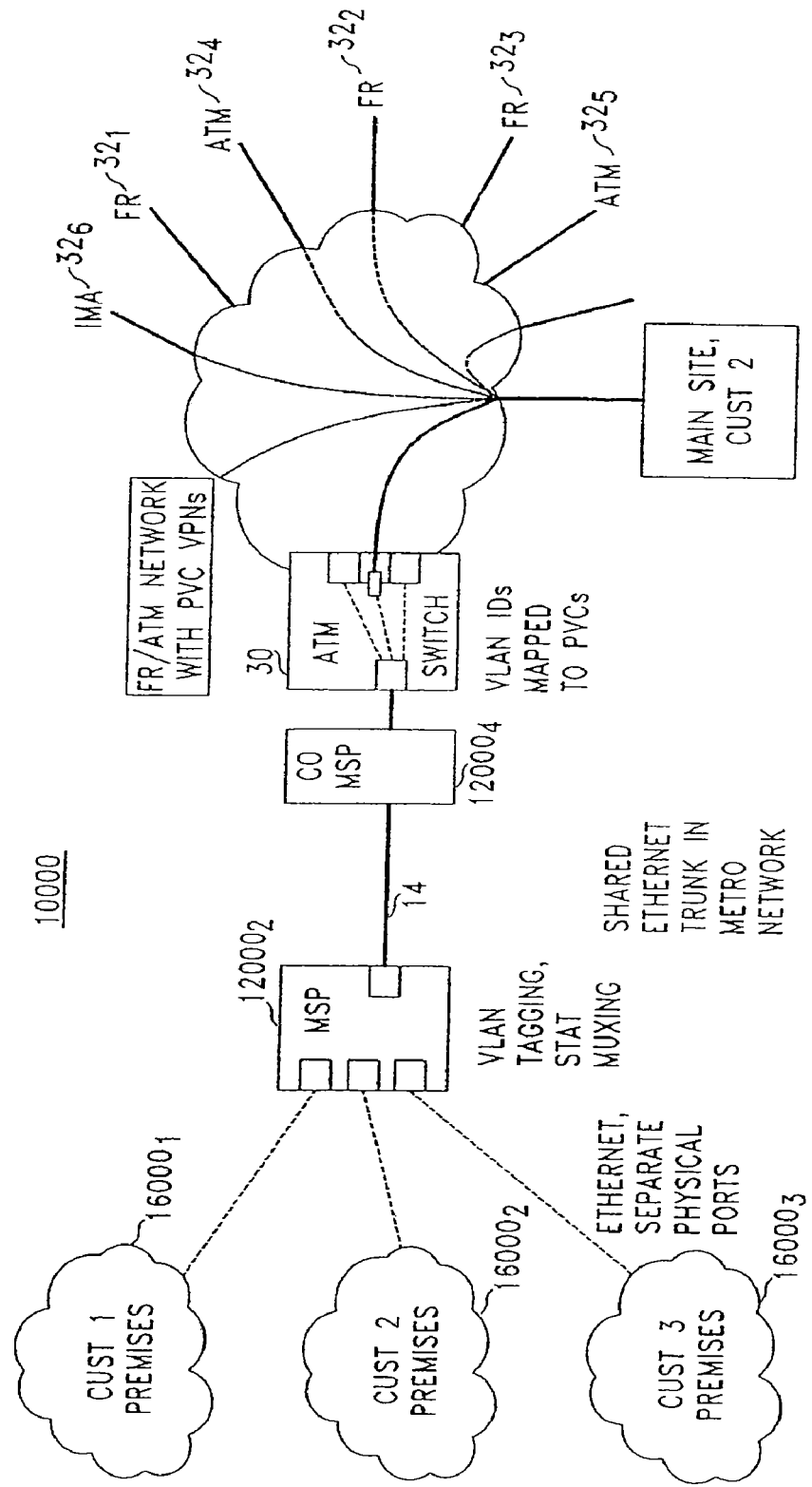
FIG. 5 illustrates a portion of a MAN showing the manner in which frames are mapped to different Permanent Virtual Circuits by an ATM switch.

In the above-described embodiments, the frames of customer traffic have been assumed to comprise IP packets that terminate on a router (i.e., Provider Edge Routers 18, 180 and 1800) and that the VPNs employ MPLS-BGP protocols. However, some customers may require multi-protocol support, or may otherwise require conventional PVCs so that the traffic streams must be mapped into Frame Relay or ATM PVCs as depicted in FIG. 5, which illustrates a portion of a MAN 10000 having a CO MSP 12000$_4$ serving an ATM switch 30 that receives traffic from the MAN. As seen in FIG. 5, each of premises 16000$_1$, 16000$_2$ and 16000$_3$ belonging to customer 1, customer 2 and customer 3, respectively, may send frames for receipt at MSP 12000$_2$ in the MAN 10000. The MSP 12000$_2$ tags each frame with the corresponding customer descriptor prior to statistically multiplexing the data for transmission on the fiber ring infrastructure 14 to the CO MSP 12000$_4$ for receipt at the ATM switch 30. The ATM switch 30 then maps each frame to the appropriate PVC in accordance with the customer descriptor 22' in the frame in a manner similar to the mapping described with respect to FIG. 3. Thus, the ATM switch 30 could map the frame to one of Frame Relay recipients' 32$_1$, 32$_2$, or 32$_3$, ATM recipients 32$_4$ or 32$_5$ or IMA (Inverse Multiplexing over ATM) recipient 32$_6$.

Figure 6:
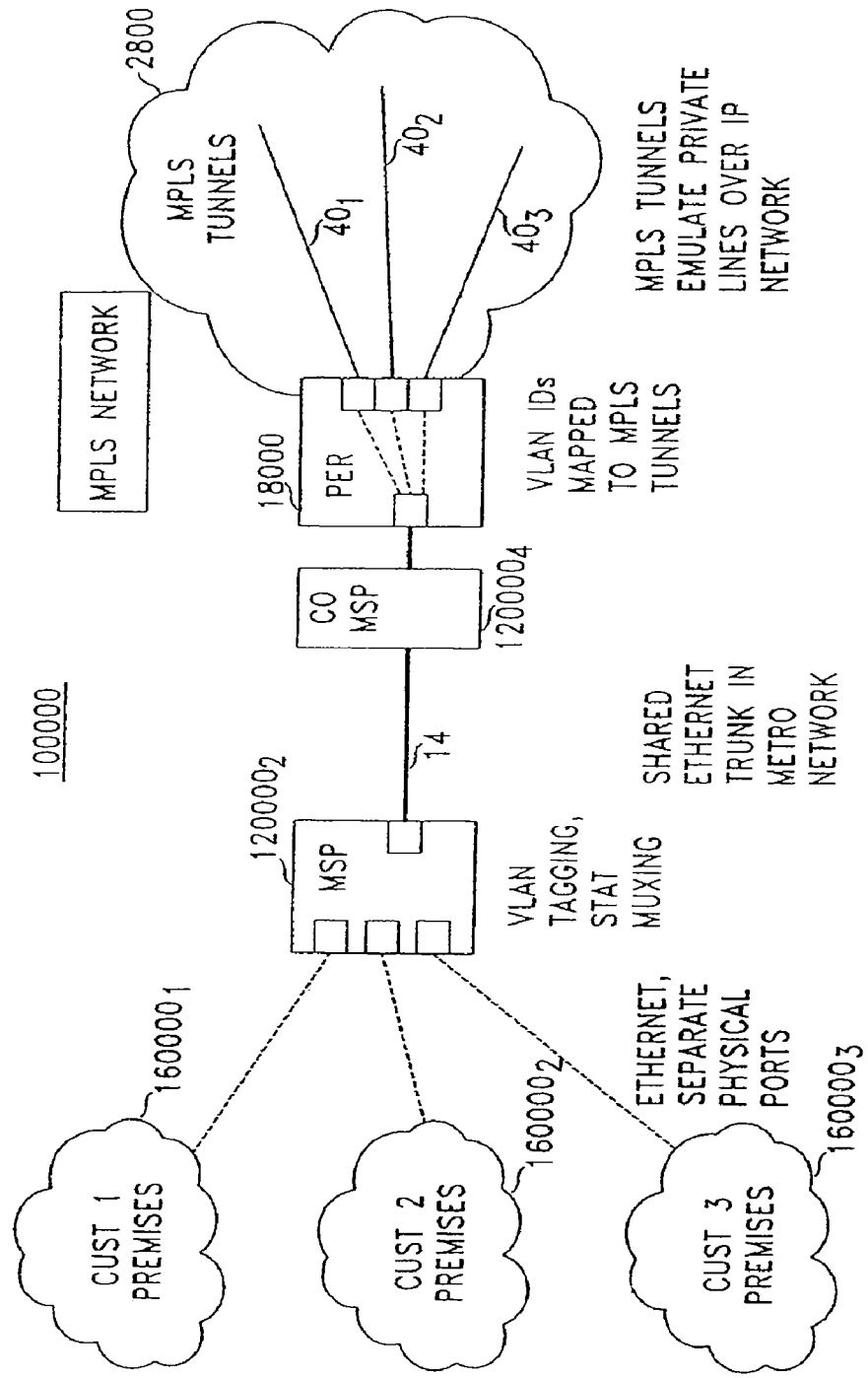
FIG. 6 illustrates a portion of a MAN showing the manner in which frames are mapped into different Multi-Protocol Label Switching (MPLS) tunnels.

FIG. 6 depicts a portion of a MAN network 100000 that routes frames onto separate MPLS tunnel 40$_1$-40$_3$ (each emulating a private line 32 in an MPLS network 28000) in accordance with the customer descriptor 22' written into each frame by a MSP 120000$_2$ in the MAN. Each of customer premises 160000$_1$, 160000$_2$ and 160000$_3$ depicted in FIG. 6 sends information frames for receipt at MSP 120000$_2$. The MSP 120000$_2$ tags each frame with the customer descriptor prior to statistically multiplexing the data for transmission on the fiber ring infrastructure 14 for delivery to a CO MSP 120000$_4$ that serves a PER 18000. The PER 18000 translates (maps) the customer descriptors written onto the frames by the MSP 120000$_2$ into the MPLS tunnels 40$_1$-40$_3$ to enable the PER to route the traffic to the intended, customer.

Figure 7:
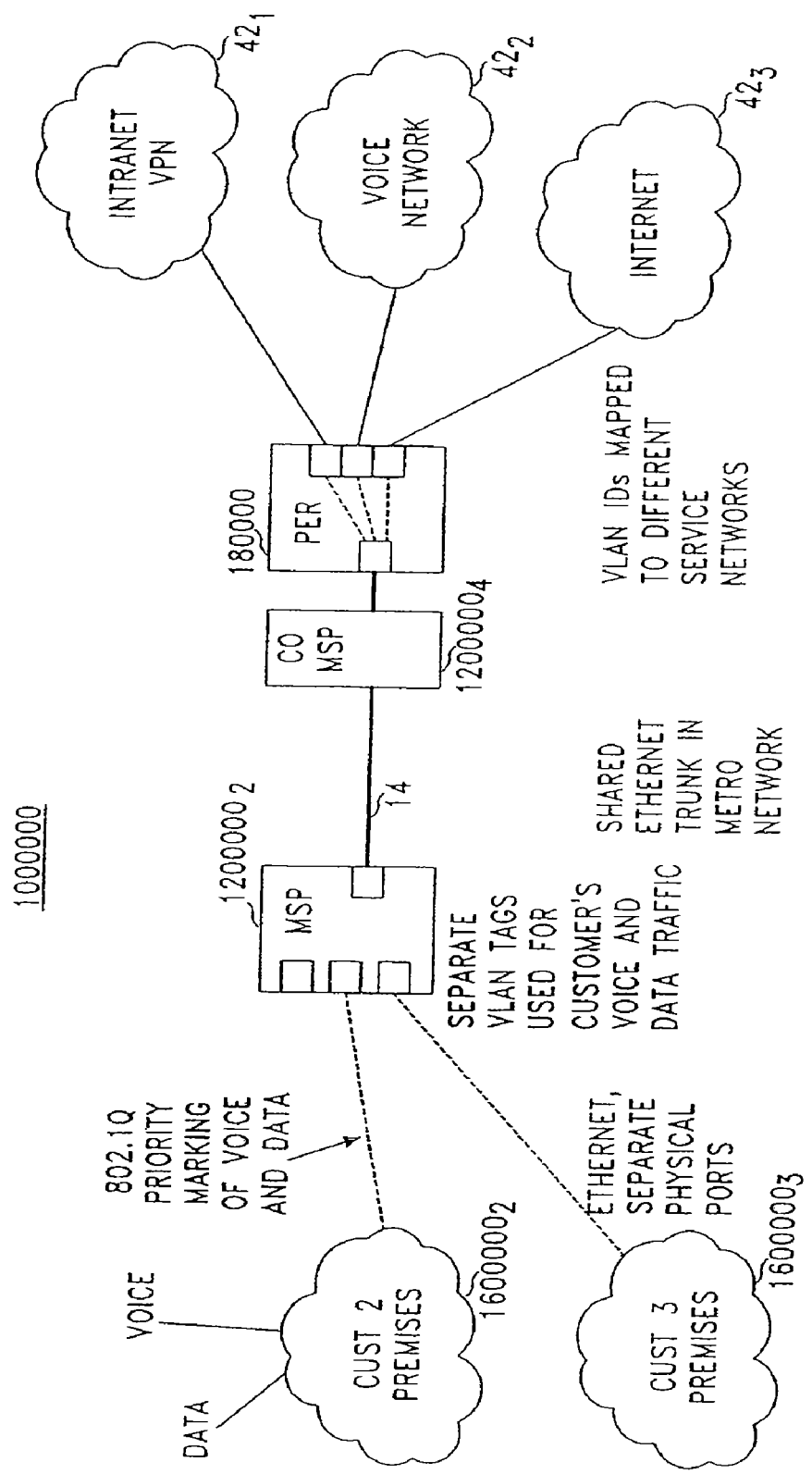
FIG. 7 illustrates a portion of a MAN showing the manner in which frames are mapped into different service networks.

FIG. 7 depicts a portion of a MAN network 1000000 for routing traffic (i.e., frames) onto separate networks in accordance with the customer descriptor written into each frame by a MSP 120000$_2$ in the MAN. Each of customer premises 1600000$_2$ and 1600000$_3$ depicted in FIG. 7 sends frames for receipt by the MSP 1200000$_2$. The MSP 1200000$_2$ tags each frame with the customer descriptor 22' prior to statistically multiplexing the data for transmission on the fiber ring infrastructure 14 for delivery to a CO MSP 1200000$_4$ that serves a PER 180000. In accordance with the customer descriptor, the PER 1800000 of FIG. 7 routes traffic to a particular one of several different networks, e.g., an Intranet VPN 42$_1$, a voice network 42$_2$ and the Internet 42$_3$, in accordance with the customer descriptor 22' written onto the frame by the MSP 1200000$_2$.

The above-described embodiments merely illustrate the principles of the invention. Those skilled in the art may make various modifications and changes that will embody the principles of the invention and fall within the spirit and scope thereof.

What is claimed is:

1. A method for routing at least one frame from an ethernet protocol network to at least one other network, each network having at least one platform serving at least one customer, associated with a virtual local area network, such that the at least one frame passes from one sending customer associated with a first virtual local area network served by a first platform to at least one receiving customer associated with a second virtual local area network served by a second platform, comprising:
   receiving at the first platform the at least one frame from the one sending customer;
   modifying the at least one frame with a customer descriptor that identifies the sending customer, wherein the modifying comprises overwriting a virtual local area network identifier field within the at least one frame with the customer descriptor;
   using the customer descriptor to map a path from the first platform to the second platform; and
   routing the at least one frame on the path.

2. The method according to claim 1 wherein the using the customer descriptor to map the path includes mapping the customer descriptor to a customer virtual private network.

3. The method according to claim 1 further including:
   providing the customer descriptor with a quality of service indicator that specifies a quality of service level afforded to the at least one frame; and
   transmitting the at least one frame to the at least one receiving customer with the quality of service level specified by the quality of service indicator provided within the customer descriptor.

4. The method according to claim 1 wherein the using the customer descriptor to map the path includes mapping the customer descriptor to a corresponding one of a plurality of frame relay or asynchronous transfer mode permanent virtual circuits.

5. The method according to claim 1, wherein the using the customer descriptor to map the path includes mapping the customer descriptor to one of a plurality of multi-protocol label switching tunnels.

6. The method according to claim 1 wherein the using the customer descriptor to map the path includes mapping the customer descriptor to one of a plurality of different service networks.

7. A method for routing at least one frame from an ethernet protocol network to at least one other network, each network having at least one platform serving at least one customer, associated with a virtual local area network, such that the at least one frame passes from a sending customer associated with a first virtual local area network served by a first platform to at least one receiving customer associated with a second virtual local area network served by a second platform, comprising:
   receiving at the first platform the at least one frame from the sending customer, the at least one frame containing a virtual local area network identifier field;
   overwriting the virtual local area network identifier field in the at least one frame with a customer descriptor that identifies the sending customer;
   using the customer descriptor to map a path from the first platform to the second platform; and
   routing the at least one frame on the path.

8. The method according to claim 7 wherein the using the customer descriptor to map the path includes mapping the customer descriptor to a customer virtual private network.

9. The method according to claim 7 further including:
   providing the customer descriptor with a quality of service indicator that specifies a quality of service level afforded to the at least one frame; and
   transmitting the at least one frame to the at least one receiving customer with the quality of service level specified by the quality of service indicator provided within the customer descriptor.

10. The method according to claim 7 wherein the using the customer descriptor to map the path includes mapping the customer descriptor to a corresponding one of a plurality of frame relay or asynchronous transfer mode permanent virtual circuits.

11. The method according to claim 7, wherein the using the customer descriptor to map the path includes mapping the customer descriptor to one of a plurality of multi-protocol label switching tunnels.

12. The method according to claim 7 wherein the using the customer descriptor to map the path includes mapping the customer descriptor to one of a plurality of different service networks.

13. An ethernet protocol network comprising:
   a fiber ring infrastructure; and
   a plurality of platforms coupled to the fiber ring infrastructure, each platform of the plurality of platforms serving at least one customer for statistically multiplexing frames onto the fiber ring infrastructure from the at least one customer and for statistically de-multiplexing frames off the fiber ring infrastructure to the at least one customer,
   wherein each platform of the plurality of platforms sending a frame overwrites a virtual local area network identifier field within the frame with a customer descriptor that identifies a sending customer, and routes the frame on a path obtained by mapping the customer descriptor to the path.

14. The network according to claim 13 wherein the receiving platform maps the customer descriptor through a provider edge router to a virtual private network.

15. The network according to claim 13 wherein the customer descriptor includes quality of service level information.

16. The network according to claim 13 wherein a receiving platform maps the customer descriptor through a provider edge router to one of a plurality of multi-protocol label switching tunnels.

17. The network according to claim 13 wherein a receiving platform maps the customer descriptor through a provider edge router to one of a plurality of different service networks.

18. In an ethernet protocol network having a plurality of platforms, with at least a first platform and a second platform serving a group of members, a method for routing at least one frame from at least one sending customer of a group served by the first platform to at least one receiving member served by the second platform, comprising:
   receiving at the first platform the at least one frame from the at least one sending customer;
   modifying the at least one frame with a customer descriptor that identifies the at least one sending customer, wherein the modifying comprises overwriting a virtual local area network identifier field within the at least one frame with the customer descriptor;
   mapping the customer descriptor to a path in the network between the first and second platforms; and
   routing the at least one frame on the path to the at least one receiving member served by the second platform.

* * * * *